(12) United States Patent
Liu et al.

(10) Patent No.: US 8,958,126 B2
(45) Date of Patent: Feb. 17, 2015

(54) PRINTING SYSTEM AND PRINTING METHOD FOR DETERMINING INK-SAVING AMOUNT

(71) Applicants: Peking University Founder Group Co., Ltd., Beijing (CN); Beijing Founder Electronics Co., Ltd., Beijing (CN)

(72) Inventors: Li Liu, Beijing (CN); Xiuqin Lu, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 0 days.

(21) Appl. No.: 14/084,908

(22) Filed: Nov. 20, 2013

(65) Prior Publication Data

US 2014/0285831 A1    Sep. 25, 2014

(30) Foreign Application Priority Data

Mar. 25, 2013    (CN) .......................... 2013 1 0097432

(51) Int. Cl.
*G06K 15/00*    (2006.01)
(52) U.S. Cl.
CPC .................................... *G06K 15/407* (2013.01)
USPC ............................................ 358/1.9; 358/2.1
(58) Field of Classification Search
None
See application file for complete search history.

(56) References Cited

U.S. PATENT DOCUMENTS

| 7,407,242 | B2 * | 8/2008 | Piatt et al. ........................ 347/7 |
| 8,582,175 | B2 * | 11/2013 | Takeo ............................ 358/1.9 |
| 2003/0107609 | A1 * | 6/2003 | Shiraishi .......................... 347/6 |
| 2005/0206915 | A1 * | 9/2005 | Uejo et al. ..................... 358/1.2 |
| 2005/0206948 | A1 * | 9/2005 | Uejo ............................ 358/1.15 |
| 2009/0046312 | A1 * | 2/2009 | Inoue ............................ 358/1.9 |
| 2010/0002246 | A1 * | 1/2010 | Ozaki et al. .................... 358/1.9 |
| 2010/0128287 | A1 * | 5/2010 | Harris et al. ................... 358/1.2 |
| 2011/0228300 | A1 * | 9/2011 | Takeo ............................ 358/1.9 |
| 2011/0228344 | A1 * | 9/2011 | Takeo .......................... 358/3.27 |

\* cited by examiner

*Primary Examiner* — Kimberly A Williams
(74) *Attorney, Agent, or Firm* — Hamre, Schumann, Mueller & Larson, P.C.

(57) ABSTRACT

Embodiments of the present invention provide a printing system and a printing method for determining an ink-saving amount. The printing system comprises: a rasterizer processor configured to load a content file, and perform a raster process according to a predetermined ink-saving parameter so as to output a raster image; a computer-to-plate (CTP) device configured to output an imaging CTP plate according to the raster image; and a CTP output device configured to print a one-bit Tiff image according to the imaging CTP plate; and an ink-saving amount determination device coupled, in parallel with the CTP device, to the rasterizer processor and configured to acquire a raster image when the ink-saving parameter is disabled and compares the raster image with a raster image acquired from the rasterizer processor when the ink-saving parameter is enabled, so as to determine the ink-saving amount available for the content file.

15 Claims, 3 Drawing Sheets

PRINTING SYSTEM AND PRINTING METHOD FOR DETERMINING INK-SAVING AMOUNT

CROSS-REFERENCE TO RELATED APPLICATIONS

The present application claims priority to Chinese Patent Application No. 201310097432.4 filed before the Chinese Patent Office on Mar. 25, 2013 and entitled "PRINTING SYSTEM AND PRINTING METHOD FOR DETERMINING INK-SAVING AMOUNT", which is incorporated herein by reference in its entirety.

TECHNICAL FIELD

The present invention relates to the field of prepress output, in particular to a printing system and a printing method for determining an ink-saving amount.

BACKGROUND

Along with the shortage of energy and an increase in the environmental stress, industrial and institutional transformation, especially in energy saving and consumption reduction, has become a focus of the development of a country and the printing industry. Meanwhile, along with an increase in the requirements on quality and production efficiency, currently printing enterprises are facing a challenge from the production cost, and how to reduce the production cost has become an important issue for the printing enterprises. Green printing is a topic to which the printing service providers pay much attention. And correspondingly, an ink-saving technology associated with the green printing has become an important research project for a prepress process.

The ink may be saved by increasing an amount of a black ink and decreasing an amount of a color ink. Upon an ink-saving processing, the ink may be transferred more easily, a small amount of fountain solutions may be used to reach an ink-water balance, and the paper waste may be reduced. In addition, there may exist a great improvement in the drying and printing operations, and the yield as well as the printing efficiency may be enhanced obviously. It is able for a user, by easily changing an ICC profile, to adapt himself to various printer such as a commercial printer, a sheet fed printer and a newspaper printer, and to various printing conditions such as different papers and inks, thereby to ensure consistency and stability of the color for one or several printing devices.

Currently, some measures for ink-saving have been applied to the printing process. However, in the prior art, the calculation on the ink-saving amount is not accurate and efficient enough. Usually, a method of manually calculating the ink-saving data is used, and the following steps are executed by an operator:

(1) disabling an ink-saving parameter in a rasterizer processor that can convert files into bitmap files, and sending a file to the rasterizer processor;

(2) enabling the ink-saving parameter in the rasterizer processor, and sending the file to the rasterizer processor again;

(3) manually comparing two copies of the data obtained through the above operations using image processing software (e.g., Photoshop), and manually calculating the ink-saving amount for the file; and (4) acquiring the quantitative data about an average ink-saving amount for each page according to the number of the files and the ink-saving amount.

However, the above mentioned method for acquiring the data about the ink-saving amount has some serious disadvantages. For example, it merely adapts to testing a single file, so it is impossible to meet the requirements of industrial production. There are great errors when bitmaps are compared with each other by using Photoshop and when the bitmap is converted into ink coverage according to the operator's experiences. In addition, the file needs to be manually submitted twice to the rasterizer processor, and merely the bitmap file processed with the ink-saving parameter is outputted actually. Due to the same file name, the operation of submitting the file twice may easily lead to confusion between the actually-output bitmap and the bitmap temporally generated to manually calculate the ink-saving amount, and as a result, an industrial accident may be caused.

SUMMARY

Due to the above-mentioned disadvantages, there is a high demand for a printing device provider on means for accurately and efficiently determining an ink-saving amount, so as to acquire objective and accurate data about the ink-saving amount, thereby to optimize the ink-saving technology in the printing process, and to market a green printing system to customers by using the ink-saving amount as a convincing specification.

In accordance with one aspect of the present invention, a printing system for determining an ink-saving amount is provided. The printing system comprises: a rasterizer processor configured to load a content file, and perform a raster process according to a predetermined ink-saving parameter so as to output a raster image; a computer-to-plate (CTP) device installed with a blank CTP plate and configured to output the CTP plate for a printing device according to the raster image; and an ink-saving amount determination device coupled, in parallel with the CTP device, to the rasterizer processor and configured to determine an ink-saving amount according to a raster image when the ink-saving parameter is disabled and a raster image when the ink-saving parameter is enabled. The rasterizer processor may be coupled to an ink-saving engine to acquire the ink-saving parameter.

In one embodiment, the ink-saving amount determination device merely disables the ink-saving parameter among JDF parameters of the rasterizer processor, maintains the other parameters as the same, and performs a raster process according to these parameters so as to acquire the raster image when the ink-saving parameter is disabled.

In addition, the ink-saving amount determination device converts, by an optimization algorithm, a one-bit image into an eight-bit grayscale image for which the ink is not saved.

In a preferred embodiment, the ink-saving amount determination device may determine the ink-saving amount by calculating and comparing the ink coverage of the raster images.

The raster images may include a one-bit image and an eight-bit grayscale image. The ink-saving amount determination device may further determine the ink-saving amount for each color separation with respect to each color separation version of the content file, e.g., cyan (C), magenta (M), yellow (Y) and black (K).

In a preferred embodiment, the rasterizer processor is coupled to the ink-saving engine to acquire the ink-saving parameter.

In another aspect of the present invention, a printing method for determining an ink-saving amount is provided. The printing method comprises:

loading a content file, performing a raster process according to a predetermined ink-saving parameter, and outputting a raster image;

outputting an imaging CTP plate according to the raster image;

disabling the ink-saving parameter and acquiring the raster image; and determining the ink-saving amount available for the content file according to a raster image acquired when the ink-saving parameter is enabled and a raster image acquired when the ink-saving parameter is disabled.

When determining the ink-saving amount, the printing method further comprises converting, by the optimization algorithm, the raster image acquired when the ink-saving parameter is enabled and the raster image acquired when the ink-saving parameter is disabled into an eight-bit grayscale image, and calculating a sum of gray values for pixels of the eight-bit image. In one embodiment, the ink coverage is equal to the sum of the gray values for the pixels of the eight-bit image divided by a product of the number of the pixels and 255.

In a preferred embodiment, the printing method further comprises storing the determined ink-saving amount in a database.

DETAILED DESCRIPTION

Figure 1:
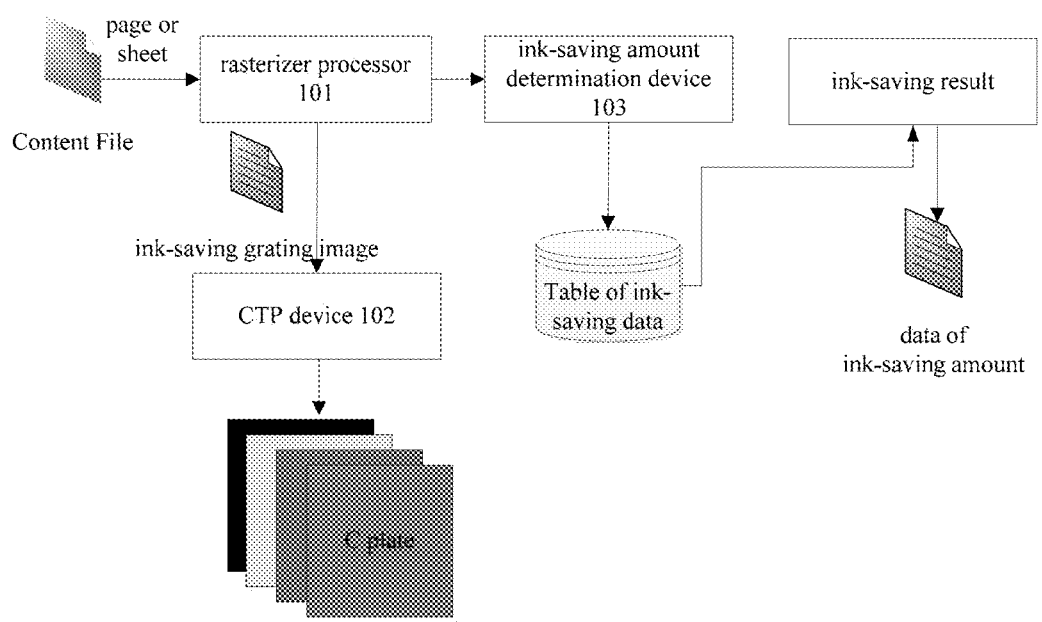
FIG. 1 is a schematic view showing the structure of a printing system according to an embodiment of the present invention.

FIG. 1 shows the structure of a printing system according to an embodiment of the present invention. As shown in FIG. 1, a rasterizer processor 101 receives a content file to be printed, and a CTP device 102 is coupled, in parallel with an ink-saving amount determination device 103, to the rasterizer processor 101. As a result, the calculation of the ink-saving amount and a normal outputting for the system form a parallel processing relationship, thereby the calculation by the ink-saving amount determination device 103 will not affect the outputting performance.

An ink-saving engine calls an open industrial standard or an ICC profile of a user so as to achieve accurate conversion of colors and parametric control over the ink-saving amount. In addition, it can also plan the implementation of different levels of the ink-saving amount according to different printing modes. The rasterizer processor 101 is provided with an interface for the ink-saving engine, so as to receive settings about the ink-saving parameter from the ink-saving engine.

When the content file is loaded into the rasterizer processor as a printing target, the rasterizer processor will perform conversion on the bitmap data according to the determined settings about the ink-saving parameter. Usually, the ink-saving process includes reducing the amount of a color ink and appropriately increasing the amount of a black ink.

During the outputting process, the rasterizer processor 101 is configured to perform a raster process on a page or a sheet, and generate one-bit TIFF bitmap data. The CTP device 102 is configured to drive a device, and output an imaging CTP plate for the subsequent printing according to the one-bit TIFF data. An eight-bit grayscale converter is built in the printing system to convert, by an optimization algorithm, the one-bit bitmap data into an eight-bit continuous tone grayscale JPG file.

Meanwhile, when the file is submitted to the rasterizer processor, the ink-saving amount determination device 103 will initiate a work instance for the determination of the ink-saving amount. For example, this instance includes performing an inverse solution on a source file and the corresponding parameters according to queue information for the printing process, disabling a color conversion solution (the settings about the ink-saving parameter), and performing the process in the case that the other parameters maintain the same, so as to acquire the one-bit TIFF data and the eight-bit grayscale JPG data in the case that the ink is not saved. In this instance, the determination of the ink-saving amount includes the following steps.

Step (1): automatically converting, by an optimization algorithm, the one-bit bitmap output data from the rasterizer processor into the eight-bit grayscale JPG data via the built-in eight-bit grayscale converter, and inputting the eight-bit grayscale JPG data into the ink-saving amount determination device 103.

Step (2): recording a storage path for the above one-bit bitmap, and the eight-bit grayscale JPG output data.

Step (3): finding an original PDF file for the content file according to a source file name in the rasterizer processor.

For example, when the file name is FounderBaseLine.tiff__1200, i.e., the bitmap data in the format of TIFF and with a resolution of 1200 dpi, a source file FounderBaseLine.tiff may be found according to the bitmap file name, and its storage path, i.e. \\computer name\upload\FounderBaseLine.tiff, may be found in a database.

Step (4): loading the parameters of the rasterizer processor in the background, modifying the ink-saving parameter among the parameters, disabling the ink-saving parameter, reserving the other parameters of the rasterizer processor, and performing a raster process after the parameters are automatically configured, so as to acquire the one-bit bitmap data and the eight-bit grayscale JPG image in the case that the ink-saving parameter is disabled.

Step (5): comparing two eight-bit grayscale JPG images acquired when the ink-saving parameter is enabled and when the ink-saving parameter is disabled. The comparison is performed based on the ink coverage.

The ink coverage may be calculated for the eight-bit grayscale JPG image. The ink coverage is equal to a sum of the gray values for pixels of the eight-bit image divided by a product of the number of pixels and 255, as expressed by the following equation:

$$R = \frac{\sum G_i}{N * 255},$$

wherein $G_i$ represents a gray value for a respective pixel of the eight-bit grayscale image, and N represents the number of pixels of the eight-bit grayscale image.

Based on the ink coverage in the case that the ink is saved and not saved, the calculated ink-saving amount is stored in a table of a SQL database. The fields for specific content files are shown in the following table.

| File name | Category | Amount of cyan ink | Amount of magenta ink | Amount of yellow ink | Amount of black ink | Total amount of ink |
|---|---|---|---|---|---|---|
| File 1' | no amount of ink is saved | Value | Value | Value | Value | Value |
| File 1 | the amount of ink is saved | Value | Value | Value | Value | Value |
| The number of files | | Difference | Difference | Difference | Difference | Total difference |

Based on the file names, the data before and after the ink is saved may be calculated respectively with respect to the color separation versions of the content file, i.e., cyan (C), magenta (M), yellow (Y) and black (K), and the difference therebetween is just the actual ink-saving amount. Also, a sum of the ink-saving amount for the color separation versions may be calculated.

Figure 2:
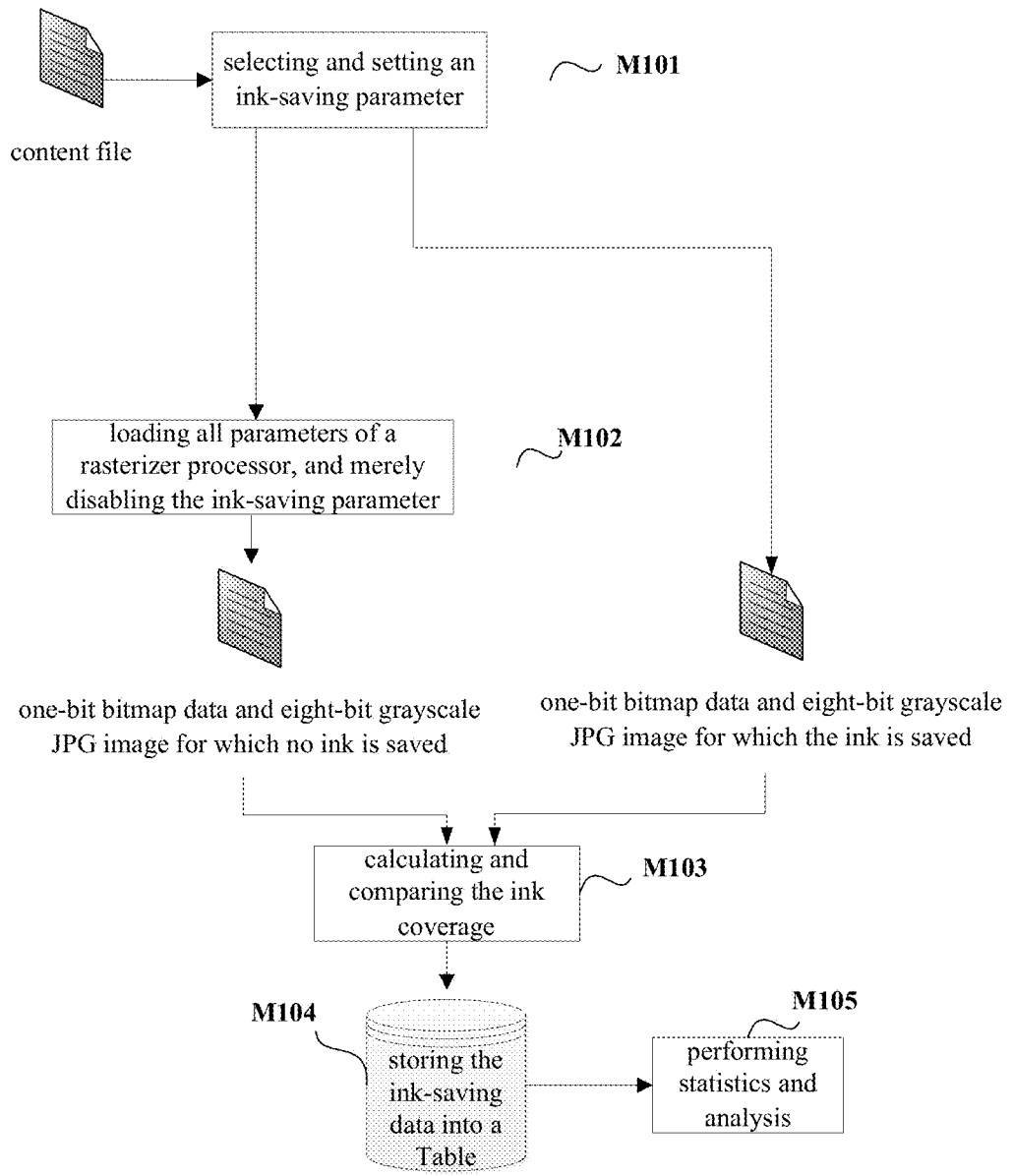
FIG. 2 is a flow chart of a printing method according to an embodiment of the present invention.

As shown in FIG. 2, the output of the CTP device and the determination of the ink-saving amount are performed in parallel. After the rasterizer processor completes its task, the CTP device 102 and the ink-saving amount determination device 103 will operate automatically. Because the CTP device 102 and the ink-saving amount determination device 103 run concurrently and their preprocessors are just the rasterizer processor, the major service (i.e., the output from the rasterizer processor and the CTP device) will not be affected by the determination of the ink-saving amount.

The embodiment of the present invention provides a new, system-level application mode for calculating the ink-saving amount intelligently and synchronously, rather than manually collecting and calculating the ink-saving amount as used in the prior art. Due to the cooperation of a series of background modules, it is able to simplify the user's operation, and enable the user to focus on the printing service he cares about, without any addition work for collecting and calculating the ink-saving amount. This new application mode is adapted to the actual production service for a prepress process. The automatic processing mechanism used by the method will not affect the output performance (speed) of the rasterizer processor and the devices. The determination of the ink-saving amount is controlled by the specific ink-saving amount determination device 103 as a background service processing. The ink-saving amount determination device 103 is located behind the rasterizer processor 101, and the determination of the ink-saving amount is performed after receiving the output from the rasterizer processor.

According to the embodiment of the present invention, it is able to ensure the outputting efficiency, and to additionally, automatically calculate the ink-saving amount for each content file (e.g., based on the ink coverage of each bitmap data), without affecting the major service.

The calculated ink-saving amount for each content file and the ink usage amount in the case that the ink is saved and not saved may be stored in the database in association with the names of the content files. The operation may be performed in real time when the client sends a request for calculation.

Figure 3:
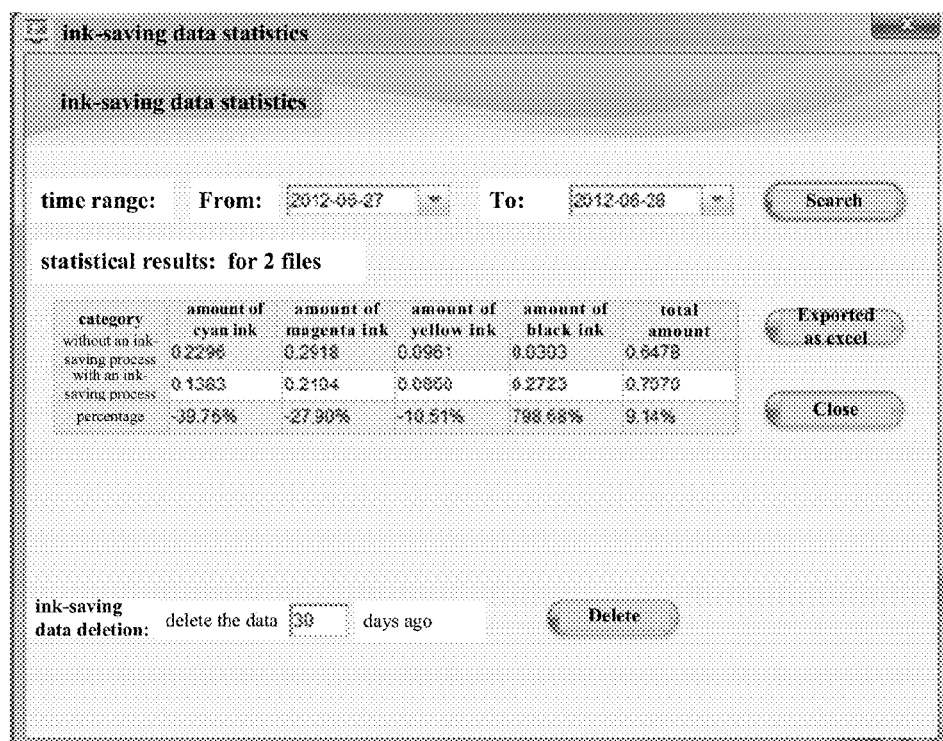
FIG. 3 is a view showing a UI for real-time output according to the ink-saving amount determined by the embodiment of the present invention.

As shown in FIG. 3, various statistical functions for the data may be achieved based on the data acquired by calculation and stored in the database in association with the ink-saving amount. Followings are some examples.

(1) When one file in the ink-saving amount determination device 103 is selected to execute a function "ink-saving result", the system will load in real time the ink-saving data of the file from a table in the database, and upon query in the database and calculation, display the calculation results in a UI. The statistical elements include the number of files, the ink amount for each color separation, the total amount of the ink, the percentage of the ink to be saved and the like.

(2) When several files in the ink-saving amount determination device is selected to execute the function "ink-saving result", the system will load in real time the ink-saving data of the files from the database, and upon query in the database and calculation, display the calculation results in the UI. The statistical elements include the number of files, the ink amount for each color separation, the total amount of the ink, the percentage of the ink to be saved and the like.

(3). When the function "ink-saving result" is executed in a client menu and the user determines a time range, the system will load in real time the ink-saving data of the files from the database, and upon query in the database and calculation, display the calculation results in the UI. The statistical elements include the number of files, the ink amount for each color separation, the total amount of the ink, the percentage of the ink to be saved and the like.

(4). The ink-saving results may be exported as an Excel spreadsheet, and the user is allowed to delete the useless information from the database. The user may set a deletion reminder, i.e., how many days the historical data should be reserved before it is deleted.

The method and system of the embodiments of the present invention adopt, instead of a dated mode of manually calculating the ink-saving amount, a reliable and excellent processing mode, so as to automatically calculate histograms and the ink coverage in a batch mode, and to perform the data statistics without affecting the output efficiency. In addition, a multilevel, multidimensional ink-saving amount report will be provided, which includes both file-level and system-level data analyses. The user may select the files he cares about, and view the ink-saving data thereof. Also, the user may perform the system-level statistics in the client within a certain period of time. The system-level ink-saving data may be exported as an electronic file or a statistical report. As a result, it is able to meet the requirements on quantitative management in the printing industry.

What is claimed is:

1. A printing system, comprising:
   a rasterizer processor configured to load a content file, and perform a raster process according to a predetermined ink-saving parameter so as to output a raster image;
   a computer-to-plate (CTP) device installed with a blank CTP plate and configured to output the CTP plate for a printing device according to the raster image; and
   an ink-saving amount determination device coupled, in parallel with the CTP device, to the rasterizer processor and configured to determine an ink-saving amount according to a raster image when the ink-saving parameter is disabled and a raster image when the ink-saving parameter is enabled.

2. The printing system according to claim 1, wherein the ink-saving amount determination device determines the ink-saving amount by calculating and comparing the ink coverage of the raster images.

3. The printing system according to claim 1, wherein the raster image is an eight-bit grayscale image obtained through converting, by an optimization algorithm, a one-bit image.

4. The printing system according to claim 1, wherein the ink-saving amount determination device determines the ink-saving amount for each color separation with respect to each color separation of the content file.

5. The printing system according to claim 4, wherein the color separation includes cyan (C), magenta (M), yellow (Y) and black (K).

6. The printing system according to claim 2, wherein the ink coverage is calculated by dividing a sum of gray values for pixels of the eight-bit image by a product of the number of the pixels and 255.

7. The printing system according to claim 1, wherein the ink-saving amount determination device stores the determined ink-saving amount in a database.

8. The printing system according to claim 7, wherein the ink-saving amount determination device, in response to a statistics command from a client, provides ink-saving data statistics according to the ink-saving amount stored in the database.

9. A printing method, comprising:
  loading a content file, performing a raster process according to a predetermined ink-saving parameter, and outputting a raster image;
  outputting an imaging CTP plate according to the raster image;
  disabling the ink-saving parameter and acquiring the raster image; and
  determining the ink-saving amount available for the content file according to a raster image acquired when the ink-saving parameter is enabled and a raster image acquired when the ink-saving parameter is disabled.

10. The printing method according to claim 9, wherein in the step of determining the ink-saving amount, the ink-saving amount is determined by calculating and comparing the ink coverage of eight-bit grayscale images.

11. The printing method according to claim 10, wherein the ink coverage is calculated by dividing a sum of gray values for pixels of the eight-bit image by a product of the number of the pixels and 255.

12. The printing method according to claim 9, wherein the ink-saving amount for each color separation is determined with respect to each color separation version of the content file.

13. The printing method according to claim 12, wherein the color separation includes cyan (C), magenta (M), yellow (Y) and black (K).

14. The printing method according to claim 9, further comprising storing the determined ink-saving amount in a database.

15. The printing method according to claim 14, further comprising, in response to a statistics command from a client, providing ink-saving data statistics according to the ink-saving amount stored in the database.

* * * * *